United States Patent

[11] 3,586,356

| | | |
|---|---|---|
| [72] | Inventor | Anthony Andrew Smalarz<br>Canoga Park, Calif. |
| [21] | Appl. No. | 8,645 |
| [22] | Filed | Feb. 4, 1970 |
| [45] | Patented | June 22, 1971 |
| [73] | Assignee | RCA Corporation |

[54] CLAMP ASSEMBLY
16 Claims, 5 Drawing Figs.

[52] U.S. Cl. ................................................ 287/20.3,
179/100.2
[51] Int. Cl. ..................................................... F16b 9/00
[50] Field of Search........................................... 287/20.3;
24/73 D, 73 R; 179/100.2 CA; 340/174.1 F;
346/74

[56] References Cited
UNITED STATES PATENTS

| | | | |
|---|---|---|---|
| 3,196,215 | 7/1965 | Casey et al.................... | 179/100.2 CA |
| 3,218,648 | 11/1965 | Casey.......................... | 340/174.1 F UX |
| 3,469,493 | 9/1969 | Fisher.......................... | 24/73 R X |

*Primary Examiner*—David J. Williamowsky
*Assistant Examiner*—Andrew V. Kundrat
*Attorney*—H. Christoffersen ABSTRACT: A two-piece lamp assembly for securing the transducer head assembly in a magnetic drum memory to a shroud surrounding the magnetic drum. The head assembly is first adjusted relative to the shroud, then the clamp assembly secures the head to the shroud while preventing misalignment of the head as the clamping action is becoming effective.

PATENTED JUN22 1971 3,586,356
SHEET 1 OF 2
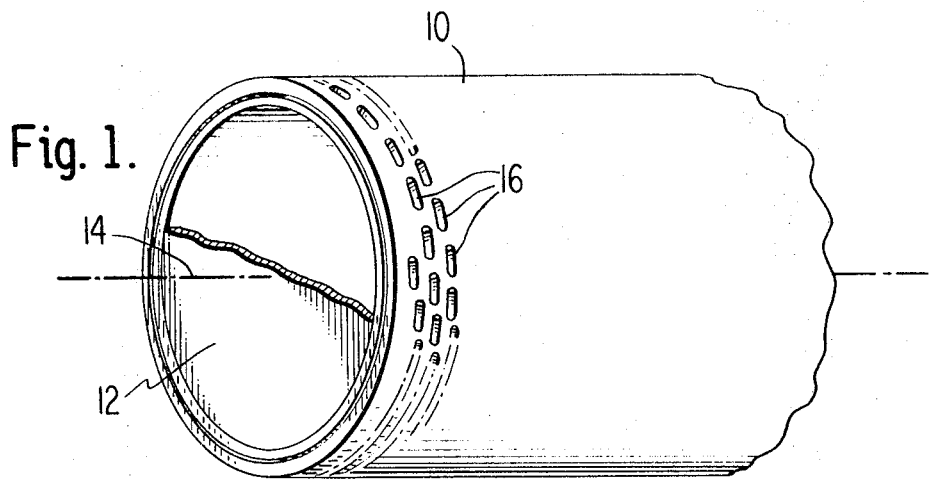
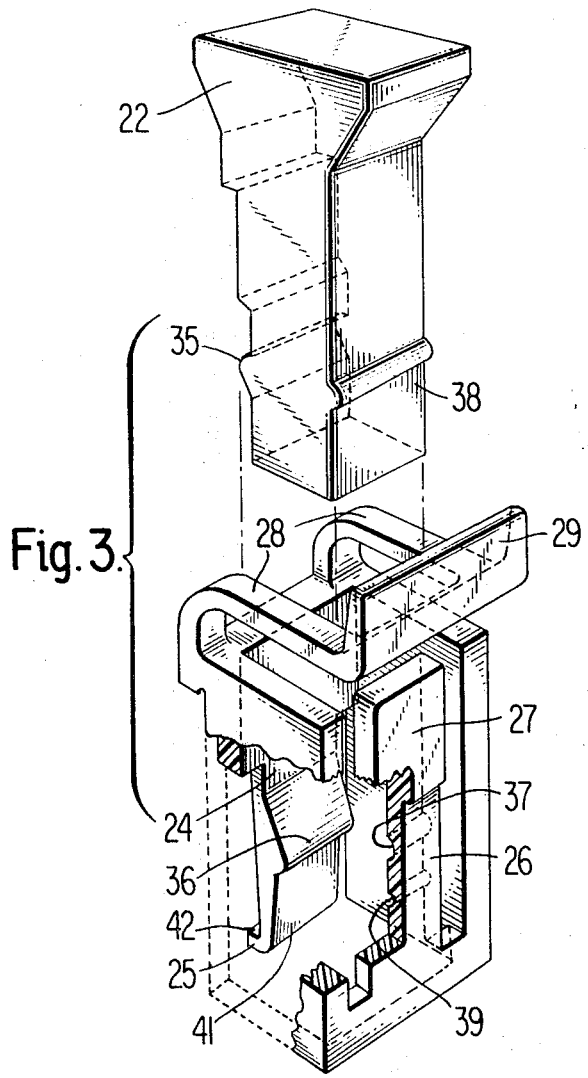
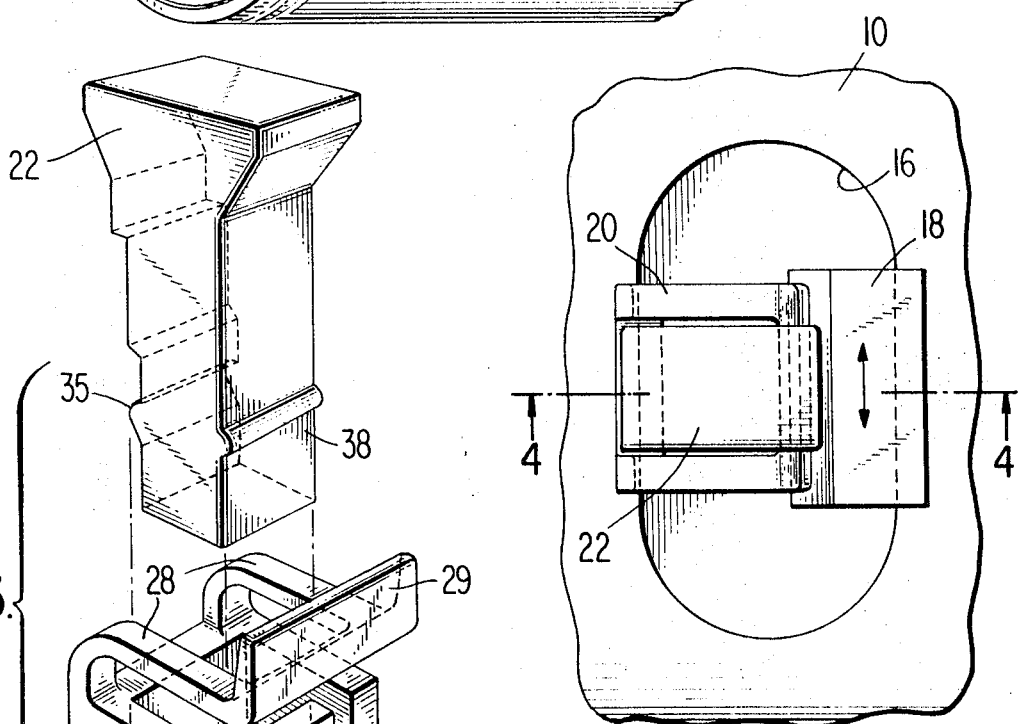
Fig. 1.
Fig. 3.
Fig. 2.
INVENTOR.
Anthony A. Smalarz
BY H. Christoffersen
ATTORNEY

PATENTED JUN22 1971

INVENTOR.
Anthony A. Smalarz
BY H. Christoffersen
ATTORNEY

CLAMP ASSEMBLY

BACKGROUND OF THE INVENTION

In many mechanical art areas there is a need for a clamping device to secure one mechanical member to another. Threaded elements such as screws or bolts are often employed to perform the clamping, however, a large number of clamps are involved and securing the threaded elements in place is too time consuming. Further, where the two members are to be adjusted relative to one another and then clamped, the threading action itself often causes relative movement between the members and readjustment is again necessary. The use of nonthreaded elements permits the clamp to be secured in place quickly, however, the clamping action often causes the aforementioned undesirable relative shifting between the elements being clamped.

It is an object of the present invention to provide a clamp with quick clamping action and little tendency to move the object being clamped.

SUMMARY OF THE INVENTION

A clamp assembly comprises a clamp body and clamp rod inserted in an opening in the clamp body. The clamp body has at least two arms, one secured at one end of the clamp body and extending toward the opposite end and a second secured at the opposite end and extending toward the first end. These arms move outwardly in response to the movement of the clamp rod into the opening in the clamp body.

BRIEF DESCRIPTION OF THE DRAWING

FIG. 1 is a perspective view of a portion of a magnetic drum memory system;

FIG. 2 is a top view showing the clamp assembly of the present invention securing a magnetic transducer head to the drum shroud;

FIG. 3 is a perspective view, partially broken away, of the clamp rod and clamp body;

DETAILED DESCRIPTION

Figure 4:
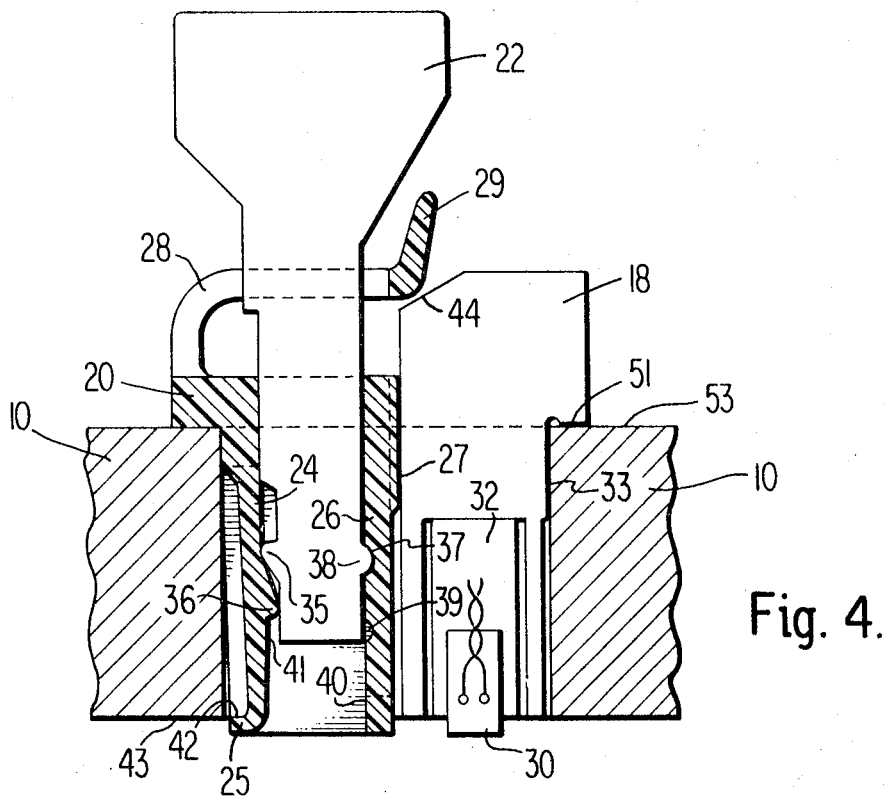
FIG. 4 is a cross section of FIG. 2 taken along lines 4—4 thereof showing the clamp assembly in its unclamped position.

FIG. 1 is a perspective view of a magnetic memory drum mechanism suitable for use with a digital computer. The mechanism comprises a shroud 10 which is fixed relative to a reference surface (not shown) and in which a rotatably mounted drum 12 is positioned. The drum is rotated about its axis 14 by a drive means (not shown). The surface of the drum 12 is coated with a magnetizable material capable of storing information in a plurality of circumferential tracks located about the drum. Corresponding to each track on the drum there is an elongated opening 16 in shroud 10 for locating a magnetic transducing head assembly. The area surrounding the opening is made flat so the transducer assembly will not have to rest on a curved portion of the shroud. In one representative magnetic drum mechanism, there are 924 information tracks located on the drum and therefore 924 openings such as 16 in the shroud.

FIG. 2 illustrates one such opening 16 in shroud 10 and is illustrated looking from the outside of the shroud toward the center of the drum. Located in the opening 16 is a head housing 18 and the two-piece clamp assembly of the invention comprising a clamp body member 20 and a clamp rod 22.

The clamp body 20 and cooperating clamp rod 22 shown in FIG. 3 are made of a suitable resilient material such as polypropylene. The clamp body is formed with three arms 24, 26 and 28 each being attached at only one end to the main portion of the clamp body. The free ends of the arms 24 and 28 include projections 25 and 29 respectively and the arm 26 has a flat raised portion 27, the purpose of which will become evident shortly.

Figure 5:
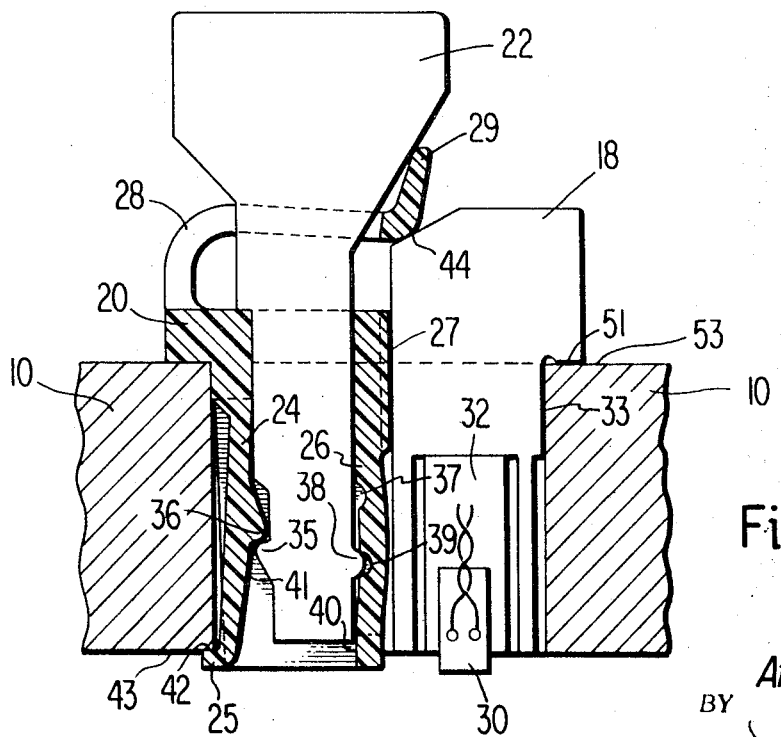
FIG. 5 is a cross section also taken along lines 4—4 of FIG. 2 showing the clamp assembly in its clamped position.

FIGS. 4 and 5 are cross sections taken along lines 4—4 of FIG. 2 and will be used to illustrate the operation of the clamp assembly. The size of the elements are greatly enlarged. For example, the opening in the shroud is only on the order of a few tenths of an inch in each direction. A conventional "flying" magnetic transducer assembly 30 is mounted in an inverted U-shaped opening in the head housing 18 by means of four flexure springs (not visible in the Figure) forming part of the transducer assembly. These springs are secured at one end to a projecting member 32 located at the rear of the opening of the head housing as viewed in FIGS. 4 and 5. Mounted in this way, when the drum comes up to operating speed, the transducer flys or floats on an extremely thin film or cushion of air, generated by the rapidly rotating drum, in conventional fashion.

The clamping assembly of the present invention is operated in the following way. First, a head housing 18 and clamp assembly 20,22 are placed in an opening 16 of shroud 10. Then, with the shoulder 51 of the housing 18 abutting the surface 53 of the shroud, the housing 18 is manually positioned along wall surface 33 of shroud 10, as shown by the double headed arrow in FIG. 2, until the transducer is positioned in the manner desired with respect to the drum surface. The adjusting procedure necessary to obtain the proper position is not part of the present invention and is therefore not further described.

When the adjustment above is completed, a light vertical pressure manually is applied to the top of clamp rod 22 to move it from the position shown in FIG. 4 to the one shown in FIG. 5 to complete the clamping action. During this movement, three concurrent clamping actions prevent the head housing from moving relative to shroud 10 and insure that adequate pressure is applied to the head housing to permanently keep it in the desired position relative to shroud 10.

In the first clamping action, projection 35 on clamp rod 22 moves beyond and is secured under a cooperating projection 36 of the clamp body to hold the clamp rod in the down or clamped position. When the projection 35 reaches this position, it bears against the inner surface 41 of arm 24 deflecting the arm outwardly. The upper surface 42 of projection 25 thereupon frictionally engages and is held in place on the inner surface 43 of the shroud preventing vertical dislodgement of the clamp body.

In the second clamping action, a second projection 38 on the clamp rod 22 during the downward movement of the rod, forces the flat portion 27 of arm 26 into lateral contact with the head housing thereby holding the head housing against wall 33 of shroud 10. Projection 38 in the unclamped position rests in a clearance depression 37 in arm 26 so that no lateral pressure is applied to the arm. As projection 38 moves toward the area of attachment 40 of the arm 26 to the clamp body, portion 27 of the arm tends to move outwardly by an ever increasing amount. There is a fulcrum multiplier effect occurring. Lateral motion of portion 27 of the arm is, however, prevented by the presence of the head housing. Instead, as clamp rod 22 is moved downwardly increasing lateral pressure is applied to the head housing 18 by the flat portion 27 of arm 26. When the rod reaches its final position, the projection 38 reaches and moves into the depression 39 (shown greatly enlarged) in the inner wall of the clamp body 20. The depression 39 is small enough so that sufficient lateral pressure is still applied to the head housing to keep the housing in place. On the other hand, depression 39 is large enough so that in cooperation with projections 35 and 36 on the clamp rod and body respectively, the clamp rod is locked in its down position.

In the third clamping action, downward and outward force on projection 29 of arm 28 causes the projection 29 to engage the surface 44 of the housing. Because of the relatively shallow taper on the clamp rod and the rather large distance through which it is moved, a very large downward pressure is exerted on projection 29 of clamp body 20 in response to only a very small vertical force on the clamp rod 22. The projection 29, when in its head housing engaging position (FIG. 5), prevents the head housing from moving out of the opening 16.

Summarizing, in the clamping arrangement of the present invention, during the movement of the clamp rod 22, the head housing is prevented from moving. In the final position of the clamp rod, the head housing is forced against the shroud to prevent side-to-side movement of the housing and is forced down in its opening against the outer surface of the shroud to prevent movement out of the opening. The clamp rod itself is held in place by detenting action (cooperating projections on the rod 22 and depressions in the clamp body 20) and by causing the clamp body 20 to lock in place in the opening in the shroud.

It is to be understood that while the invention has been described in the context of a magnetic drum memory mechanism employing a shroud and a plurality of head housings to be secured thereto, the clamp described is not limited to this use.

What I claim is:

1. A clamp assembly comprising, in combination:
   an elongated clamp body having an opening in the direction of its length dimension for receiving a clamp rod, said clamp body having first and second arms, said first arm being secured at one end to one end portion of the clamp body and having a free end extending toward the opposite end portion of the clamp body and said second arm being secured at one end to said opposite end portion of the clamp body and having a free end extending toward said one end portion of the clamp body; and
   a clamp rod for said clamp body including means responsive to the movement of the clamp rod into said opening in said clamp body for engaging said arms and moving them outwardly.

2. The combination as set forth in claim 1, wherein said clamp rod is formed with a wedge-shaped projection on its outer surface and at least one of said arms is formed with a corresponding wedge-shaped projection on its inner surface for engagement by the wedge-shaped projection of said rod as the latter is moved into said body for providing a mechanical advantage in the translation of the movement of the rod to the outward movement of said arm.

3. The combination of claim 2, wherein each projection is formed with a relatively gradually sloping leading edge and a relatively steep lagging edge and said projections being dimensioned such that when said rod is moved a given distance into said opening, the projection on the rod passes beyond the projection on said arm, and wherein, the arm on which said projection is located is resilient, whereby when one projection passes the other, the projection on the arm snaps back in place against the rod and the lagging edges of the projections lock the rod in position in the body, making withdrawal of the rod difficult.

4. The combination as set forth in claim 1, wherein one of said arms includes a depression in a wall forming said opening in said clamp body and wherein said clamp rod includes a cooperating projection located on a surface adjacent to said surface on said arm containing said depression which moves into said depression when the rod is moved a given distance into said body for holding said rod in position in said clamp body in which said arms are in their normal position.

5. The combination as set forth in claim 4, in which said one of said arms includes a second depression beyond and in the same surface of the arm as the depression described in claim 4, said second depression being shallower than the other depression, and said projection on said arm moving into said second depression in response to movement of said rod an additional distance into said body for locking said rod in a position in said clamp body in which it tends to force said one arm to its outward position.

6. The combination of claim 5 and further including the subject matter of claim 3, wherein the arm set forth in claim 3 is a different arm than the one set forth in claim 5.

7. The combination as set forth in claim 1, further including a member having an opening therein in which said body is located, said member having a thickness less than the length of said body, and wherein at least one of said arms has a raised portion on a surface which forms the exterior periphery of said clamp body in the vicinity of said free end of said arm, said raised portion extending in a direction normal to the direction of said length dimension of said clamp body, said raised portion being adapted to hold the body in place in said opening by snapping in place over an edge of the opening in response to movement of said rod into said body more than a given distance.

8. The combination as set forth in claim 1, wherein said clamp body further includes a third arm extending from one end of said clamp body in a direction generally normal to the direction of said length dimension of said clamp body, and wherein said clamp rod includes means responsive to movement of said clamp rod into said opening in said clamp body for engaging said third arm and moving it in the direction of movement of said clamp rod.

9. A clamp assembly comprising, in combination:
   an elongated clamp body having an opening in the direction of its length dimension for receiving a clamp rod, and having at least one arm extending from the body in the general direction of its length dimension;
   a clamp rod for said clamp body including means responsive to the movement of the clamp rod into said opening in said clamp body for engaging said arm and moving it outwardly;
   said clamp body further including an additional arm extending from one end of said clamp body in a direction generally normal to the direction of said length dimension; and
   said clamp rod including further means responsive to the movement of the clamp rod into said opening in said clamp body for engaging said additional arm and moving it in the direction of said length dimension.

10. An arrangement for holding a first element in place in an opening in a second element comprising, in combination;
    a clamp body located in said opening and extending between the first element and the inner surface of the opening opposite the first element, said clamp body being formed with an opening therein for receiving a clamp rod, and said clamp body including at least two arms, one secured at one end to one end of the clamp body and free at its other end and the other secured at one end to the opposite end of the clamp body and also free at its other end;
    a clamp rod located in the clamp body and including means for engaging and tending to move outwardly the free ends of said arms as the clamp rod is inserted into said opening for causing said arms to bear against both the inner surface of the opening in said second element and said first element, thereby securing both the clamp body and first element in place.

11. In combination:
    a first mechanical element having an opening for receiving another mechanical element;
    a second mechanical element, a portion of which is located in said opening;
    an elongated clamp rod of substantially rectangular cross section;
    an elongated clamp body of substantially rectangular cross section, a portion of which is located in said first element opening, and itself having an opening in the direction of its length dimension for containing said clamp rod, said clamp body having first arm means extending from one end of said clamp body for maintaining said second mechanical element against an inner wall of said opening of said first mechanical element by applying pressure in a direction normal to said length dimension of said clamp body, having a second arm means extending from an opposite end of said clamp body for maintaining said clamp body in said opening, and having a third arm means extending from one end of said clamp body for maintaining said second member against an exterior surface of said first member in the vicinity of said opening by applying pressure in a direction parallel to the length dimension of said clamp body, each of said three actions occurring in response to the movement of said clamp rod into said opening in said clamp body.

12. In combination:
a first mechanical element having an opening for receiving another mechanical element;
a second mechanical element at least a portion of which is located in said opening;
an elongated clamp body at least a portion of which is also located in said opening, said portion extending between and engaging said second element and an inner surface of the opening opposite said second element, said clamp body being formed with an opening extending in the same direction as said opening in said first mechanical element for receiving a clamp rod, and said clamp body including at least one arm which is secured at one end to the clamp body and is free at its opposite end; and
a clamp rod located in the clamp body and including means for engaging and moving outwardly said arm as the clamp rod is inserted into said opening for causing the arm to bear against one of the inner surfaces of the opening in said first mechanical element and said second mechanical element thereby securing both the clamp body and the second element in place.

13. The combination of claim 12, wherein said clamp body includes two arms, the first arm secured at one end to the first end of said clamp body, and the second arm secured at one end to said second end of said clamp body, for movement outwardly in opposite directions and wherein said clamp rod includes means responsive to the movement of said clamp rod into said opening in the clamp body for moving both arms outwardly.

14. In combination:
a first element having an opening for receiving another mechanical element, said opening extending from a first exterior surface to a second exterior surface;
a second element, a portion of which is located in said opening in said first element and a portion of which is in contact with a portion of said first exterior surface contiguous to said opening;
a clamp body, a portion of which is located in said opening, said clamp body being formed with an opening for receiving a clamp rod, said clamp body including a first arm attached at one end to one end of said clamp body and extending in a direction of said first element opening, said arm having an outwardly extending projection on its free end, said clamp body including a second arm secured at one end to one end of said clamp body and extending in a direction normal to said opening in said first element with its free end in contact with said portion of said second element which is outside said opening in said first element; and
a clamp rod located in said clamp body and including means for engaging and moving said free end of said first arm as said clamp rod is inserted into said clamp body opening whereby said projection engages said second exterior surface of said first element to maintain said clamp body in said opening in said first element, and including means for engaging and moving said second arm as the clamp rod is inserted into said opening for causing the arm to bear against said second element to maintain it in contact with said first exterior surface of said first element.

15. The combination as set forth in claim 14, wherein said clamp body also includes a third arm attached at one end to the end of said clamp body opposite that to which said first arm is attached, said third arm extending in the direction of said opening in said first element, and wherein said free end of said third arm bears against a surface of said second element within said first element opening, and wherein said clamp rod includes further means for engaging said third arm for applying pressure thereto for maintaining said second element from lateral movement in said first element.

16. The combination of claim 15, wherein said clamp rod includes means for applying pressure to said third arm proportional to the distance said clamp rod is moved into said clamp body, the pressure increasing with increasing distance.